United States Patent
Gaia et al.

(10) Patent No.: US 8,911,201 B2
(45) Date of Patent: Dec. 16, 2014

(54) TURBINE FOR THE EXPANSION OF GAS/VAPOUR PROVIDED WITH CONTRAST MEANS OF THE AXIAL THRUST ON THE DRIVE SHAFT

(75) Inventors: Mario Gaia, Brescia (IT); Roberto Bini, Brescia (IT)

(73) Assignee: TURBODEN S.r.l., Bresica (IT)

(*) Notice: Subject to any disclaimer, the term of this patent is extended or adjusted under 35 U.S.C. 154(b) by 482 days.

(21) Appl. No.: 13/257,046

(22) PCT Filed: Mar. 16, 2010

(86) PCT No.: PCT/IT2010/000111
§ 371 (c)(1),
(2), (4) Date: Sep. 20, 2011

(87) PCT Pub. No.: WO2010/106568
PCT Pub. Date: Sep. 23, 2010

(65) Prior Publication Data
US 2012/0003087 A1    Jan. 5, 2012

(30) Foreign Application Priority Data
Mar. 19, 2009  (IT) .............................. BS2009A0052

(51) Int. Cl.
  F01D 3/04    (2006.01)
  F02C 7/06    (2006.01)
  F01D 25/16   (2006.01)

(52) U.S. Cl.
  CPC ... F01D 3/04 (2013.01); F02C 7/06 (2013.01); F05D 2240/14 (2013.01); F01D 25/162 (2013.01)
  USPC .......................................... 415/107

(58) Field of Classification Search
  CPC .......... F01D 3/04; F01D 25/162; F02C 7/06; F05D 2240/14
  USPC ............... 415/93, 94, 96, 104, 106, 107, 110, 415/111, 113, 129, 131, 132
  See application file for complete search history.

(56) References Cited

U.S. PATENT DOCUMENTS 920,127 A * 5/1909 Pullagar ....................... 415/107
1,347,591 A * 7/1920 Roder .......................... 415/107
1,895,003 A * 1/1933 Meyer ........................... 415/48

(Continued)

FOREIGN PATENT DOCUMENTS

FR   2 544 380 A1   10/1984
GB     368 578 A    3/1932

*Primary Examiner* — Edward Look
*Assistant Examiner* — Eldon Brockman
(74) *Attorney, Agent, or Firm* — McGlew and Tuttle, P.C.

(57) ABSTRACT

The invention concerns a turbine for the expansion of gas and vapor, comprising a body or case, a fixed external sleeve member, overhanging frontally from a frontal wall of said case, and a turbine shaft (15) extending coaxially and rotating in said external sleeve member (18) with the interposition of a supporting unit (19). The external sleeve member has a head flange to axially hold said supporting unit; the turbine shaft ends with a joint to connect it to a device to be operated. The supporting unit (19) includes ball bearings to support the turbine shaft (15) in said external sleeve member (18), and between said external sleeve member (18) and a contiguous end of said turbine shaft (15) an aggregate (50) is provided to generate an adjustable axial force so as to compensate the axial thrust of the turbine shaft to limit the application of improper axial loads on the ball bearings.

15 Claims, 2 Drawing Sheets

(56) References Cited

U.S. PATENT DOCUMENTS

| | | | | |
|---|---|---|---|---|
| 3,218,110 A | * | 11/1965 | Conner | 384/481 |
| 3,881,841 A | * | 5/1975 | Straniti | 415/131 |
| 3,895,689 A | * | 7/1975 | Swearingen | 184/6.4 |
| 4,722,661 A | * | 2/1988 | Mizuno | 415/131 |
| 5,046,920 A | * | 9/1991 | Higashi et al. | 415/111 |
| 5,368,439 A | * | 11/1994 | Piazza | 415/131 |
| 5,713,720 A | * | 2/1998 | Barhoum | 415/104 |
| 5,749,700 A | | 5/1998 | Henry et al. | |
| 5,800,122 A | * | 9/1998 | Blattmann | 415/229 |
| 5,823,539 A | * | 10/1998 | Rockwood | 277/390 |
| 5,846,049 A | * | 12/1998 | DuPuis | 415/131 |
| 5,951,244 A | * | 9/1999 | Knight, Sr. | 415/132 |
| 6,224,322 B1 | * | 5/2001 | Calboreanu | 415/34 |
| 6,232,688 B1 | * | 5/2001 | Ress et al. | 310/90.5 |
| 6,287,074 B1 | * | 9/2001 | Chancellor | 415/231 |
| 6,368,053 B1 | * | 4/2002 | Knight, Sr. | 415/132 |
| 6,375,414 B1 | * | 4/2002 | Delaney | 415/111 |
| 6,893,213 B1 | * | 5/2005 | Quill et al. | 415/131 |
| 7,168,915 B2 | * | 1/2007 | Doering et al. | 415/121.1 |
| 7,354,240 B2 | * | 4/2008 | Choi et al. | 415/104 |
| 7,402,020 B2 | * | 7/2008 | Beers et al. | 415/1 |
| 7,780,402 B2 | * | 8/2010 | Buschkopf | 415/39 |
| 8,049,386 B2 | * | 11/2011 | Vanderzyden | 310/90 |
| 8,133,007 B2 | * | 3/2012 | Marcelli | 415/104 |
| 8,333,548 B2 | * | 12/2012 | Begin et al. | 415/106 |
| 2006/0051198 A1 | * | 3/2006 | Torres-Reyes | 415/111 |
| 2008/0187434 A1 | * | 8/2008 | Neiszer | 415/104 |
| 2009/0311089 A1 | * | 12/2009 | Begin et al. | 415/104 |
| 2010/0068031 A1 | * | 3/2010 | Marcelli | 415/104 |

* cited by examiner

US 8,911,201 B2

TURBINE FOR THE EXPANSION OF GAS/VAPOUR PROVIDED WITH CONTRAST MEANS OF THE AXIAL THRUST ON THE DRIVE SHAFT

FIELD OF THE INVENTION

The present invention concerns the field of the turbine for the expansion of gas and vapour, and refers in particular to a means suitable to contrast the axial thrusts on the turbine shaft to protect the support bearings of the shaft itself.

STATE OF THE TECHNIQUE

A turbine for the expansion of gas and vapour of the type taken into consideration herein basically comprises a fixed body or casing with an entrance passage and an exit passage of the work fluid, a statoric group with one or more stators in succession for the as many turbine stags, a rotoric group with one or more rotors depending on the number of stators, a turbine shaft turning around an axis and carrying said rotoric group, and a system for assembling and supporting said turbine shaft on the body or casing. This system comprises an external sleeve member fixed on the front of and jutting out from the body or casing of the turbine and a supporting unit for the turbine shaft inserted and centred in said sleeve member. Furthermore, the external end of the turbine shaft is usually provided with a head joint by the means of which it transmits a torque to a device to be powered.

To support the turbine shaft it is preferable to use roller bearings. In fact roller bearings can be made without intrinsic play, so that the radial positions of the machine shaft whether idle or functioning, coincide. Furthermore, the roller bearings are less expensive than the plain bearings, and can withstand a brief lack of lubrication, which on the other hand would rapidly damage the plain bearings. In addition, the roller bearings are not damaged by frequent starting and stopping, on the contrary to the plain bearings. Unfortunately, however, roller bearings are not suitable to support high axial loads unless to the detriment of the it integrity and functionality. On the other hand, during the functioning of the machine, the turbine shaft is subjected to difficult to control axial thrust, which tends to negatively influence any type of bearings and compromises their duration, all the more if they are the rotation type.

OBJECTS AND SUMMARY OF THE INVENTION

The main objective of this invention is to avoid this drawback and to allow, however, a safe use and an efficient protection of the roller bearings in their support of the exit shaft of a turbine.

This object is reached with a turbine according to the preamble in claim 1, wherein the turbine shaft is centred and supported by roller bearings and wherein between the free end of the fixed external sleeve member and the contiguous end of the turbine shaft is provided with an aggregate designed to generate an adjustable axial force such as to compensate from time to time the axial thrust of the turbine shaft, avoiding improper loads on said roller bearings.

Furthermore, whatever the type of bearings may be, roller or plain supporting the turbine shaft, it is important for the change of bearings, when necessary, to be easy and rapid, the same applying to the change of the rotating seals (whether they are flat faced mechanical seals, gas seals, labyrinth seals or another known type) used to block the passage of the work fluid from the internal volume of the turbine to the atmosphere and to avoid, vice versa, the entrance of air in the internal volume of the expander when the pressure of the work fluid is lower than that of the atmosphere.

This invention also proposes to solve this problem by making sure that the supporting unit complete with supporting bearings and sealing means associated with the turbine shaft is extractable in bloc from the fixed external sleeve member, except for the turbine shaft in that it cannot be separated from the rotoric group.

Therefore the invention proposes improvements to a turbine for gas and vapour expansion carried out by technical solutions that allow to effectively conjugate precise coupling and suitably requirements of the fixed and rotating parts, to avoid the onset of loads due to the deformation of the mechanical structures to effectively oppose the axial thrusts on the turbine shaft, and to facilitate the assembly/disassembly operations of the supporting unit of said shaft, facilitating, when necessary, every maintenance operation and/or change of bearings and sealing means.

BRIEF DESCRIPTION OF THE DRAWINGS

The invention will however be described in the following in more detail, making reference to the schematic drawings enclosed, in which.

Figure 1:
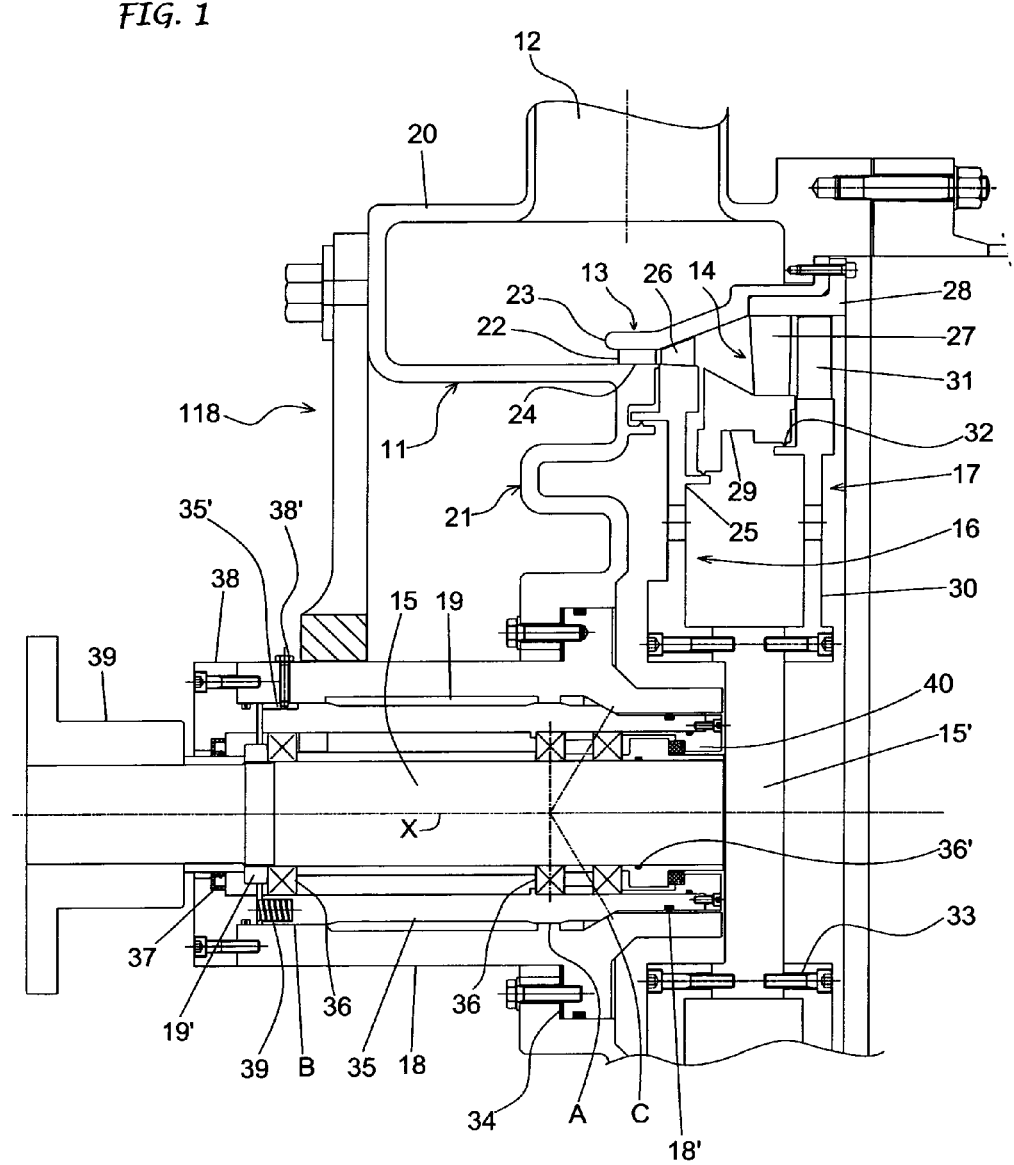
FIG. 1 shows a sectional view of a part of the assembled turbine.

In the example shown, the turbine, only partially represented, is the axial type with two or more stages and basically comprises a body or casing 11 with an entrance passage of the fluid 12 and an exit passage—not shown—, a first stator 13 and a second stator 14 respectively of a first and second turbine stages, a turbine shaft 15 rotating around an axis X and carrying a first rotor 16 and a second rotor 17 respectively associated downstream with the first stator 13 and downstream of the second stator 14, and a system for assembling said shaft on the body or casing. This system is made up of a sleeve member 18 and a supporting unit 19, and the body or casing 11 of the turbine comprises a volute 20 through which the fluid, that arrives from the entrance passage, is carried to the stator 13 of the first stage and in succession to the second stage or successive stages. The volute 20 can be integrated with an annular shield 21 that extends radially towards the axis X of the shaft 15. The casing 11 and the shield 21 can then be an integral piece or be fixed between them by welding or by a flanged coupling. Further, the shield 21 in particular is not flat but, seen in a meridian cross-section, has a undulating shape, defined by a succession of cylindrical or also conical parts and by radial portions, that is to say with loops and protrusions—FIG. 1. This configuration is such as to give the shield high axial symmetry, allowing deformations of the shield in order to limit the stresses caused by the differences in temperature between the inside and the outside of the turbine so as not to affect the coaxiality of the system.

The stator 13 of the first stage of the turbine is made up of a relative first plurality of statoric blades 22 fixed towards the outside to a first statoric ring 23. This ring is fixed overhanging inside the volute 20, or to a flange connected to it, so that the ends of said blades 22 rest against the internal surface 24 of a part of the volute 20 just upstream of the rotor 16 of the first stage, directly, or by means of an interposed calibrated ring—not shown—which would then make work more simple. The first rotor 16 is made up of a relative disc 25 fixed to the turbine shaft 15 an d carrying radial blades 26 facing towards and skimming said statoric ring 23 with reduced clearance and/or with the possible interposition of a peripheral ring, continuous or segmented, attached to the blades.

Likewise, the stator 14 of the second stage of the turbine is made up of a relative second plurality of statoric blades 27 externally supported by a second statoric ring 28, which is fixed like the first statoric ring 23, or as one, inside the volute, or to a flange connected to it, so that the ends of said second blades 27 rest against an interstage diaphragm 29 just upstream of the second rotor 17. Also this second rotor is made up of a relative disc 30 fixed to the turbine shaft 15 and carries radial blades 31 facing towards and skimming said second statoric ring.

The interstage diaphragm 29 is static, positioned between the discs of the two rotors 16, 17 with the interposition of cusp shaped labyrinth seals 32.

As a whole, the support of the statoric blades, in particular those of the first statoric ring that are less radially extended, directly or indirectly to the internal surface of the volute 20, ensures the concentricity between the rotation axis of the rotors 16, 17, and the external statoric rings during the functioning of the turbine, a condition that would not exist if it depended on only the internal side of the volute 18, larger and connected to the sleeve member 18 with a longer route and subject to greater difference in temperature.

The turbine shaft 15 has a preset diameter, and at its end facing towards the inside of the turbine it can have at least a head 15' made preferably in an integral form with the shaft—FIG. 1—. Discs 25, 30 of the rotors 16, 17 are fixed to the head 15' of the shaft 15, for example both by means a system of screwed tie rod or the like 33.

The sleeve member 18 of the mounting system for the turbine shaft 15 is connected coaxially to the shield 21 and protrudes from the front of the casing 11 according to the axis X of said shaft. The connection can be carried out by welding or by means of flanging, in the second case with the interposition of spacers preferably made up of washers 34 that can be different in width or placed one on top of the other in different quantities to establish correct radial play between the ends of the rotoric blades and the corresponding external statoric ring, that is between the external ring (continuous or segmented) and the corresponding statoric part.

The supporting unit 19 of the turbine shaft 15 is made up of components that are assembled when fitted in the sleeve member around the shaft and which are then, preferably, extractable altogether axially from the sleeve member 18 except for the shaft. In particular, the supporting unit 19 comprises a coupling 35 concentric to the turbine shaft 15, that has an external diameter compatible with the internal diameter of the sleeve member 18 and which receives internally, with the help of spacers, bearings 36 and a sealing system 40 operating on the shaft.

It is important for the radial connection of the supporting unit with the sleeve member 18 to be made so as not to cause deformations of the internal coupling 35 nor variations in its coaxiality with regards to the turbine shaft. This aim is reached by an isostatic type connection having two circumferential supporting zones A, B, with limited surface extensions and distanced in parallel, and a conical or spherical rest zone C between the two components at their ends facing towards the rotors 16, 17, of the turbine.

The supporting unit 19 is held axially in the sleeve member 18 by a head flange 38 fixed to the free end of said sleeve member 18 with the interposition of a seal 37. At the free end of the turbine shaft 15, that extends beyond the head flange 38 of the sleeve member 18, a joint 55 is fixed for a connection of the turbine shaft to an apparatus to be controlled. On the other side, between the head flange 38 and the coupling 35 thrust springs 39 are positioned which are selected and operating so as to ensure the physical contact of the two components—sleeve member/coupling—in their conical or spherical support zone C, dominating both the load due to possible unbalance of the turbine and the one due to the thrust of the work fluid.

At the internal end of the coupling 35, between this and the head 15' of the turbine shaft 15 there can also be positioned a mechanical sealing system indicated by the number 40, and is also extractable together with the other components of the supporting unit 19.

Furthermore, the sleeve member 18 and the coupling 35 are radially engaged between them by a screw or key 18' so as to define the insertion position and prevent the rotation of the coupling into the sleeve member. The screw or key 18' engages in an extended seat 35' so as to allow small axial movements of the supporting unit 19 in regard to the shaft 15 and the member 18

According to the invention, the turbine is provided with a n aggregate 50 to oppose the axial thrust on the turbine shaft 15 and safeguard the roller bearings 36 maintenance support of the shaft 15 which otherwise it would not be able to support high axial loads. In the examples illustrated—FIGS. 2 and 3—such an aggregate is placed between the head flange 38 of the fixed sleeve member 18 and the terminal joint 55 of the turbine shaft 15 and configured to generate an adjustable axial force, sufficient to compensate the thrust on the turbine axis due to the fluid pressure in the machine.

Figure 2:
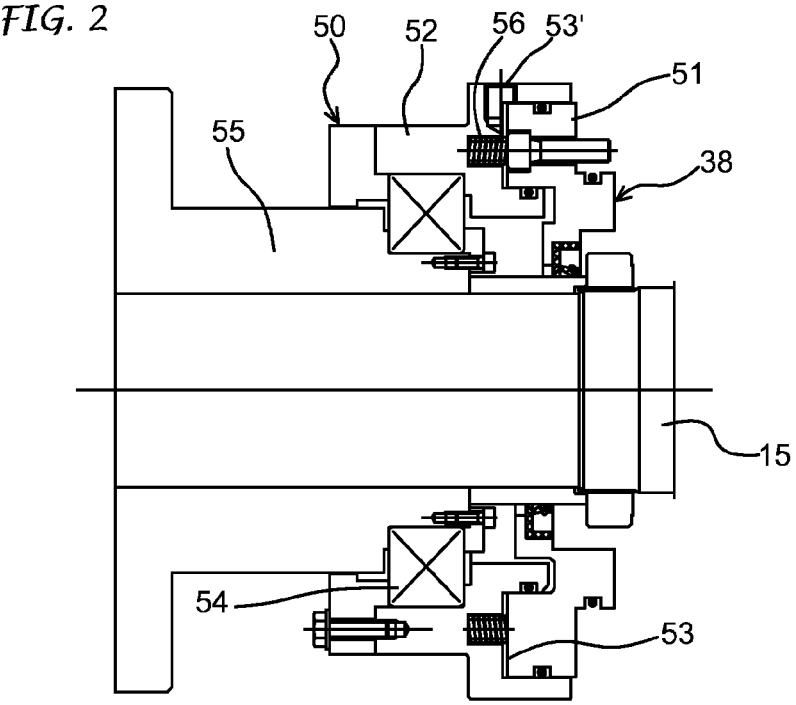
FIG. 2 shows the whole of a first contrast aggregate form of the axial thrust on the turbine shaft.

According to a way of execution as shown in FIG. 2, the aggregate 50 is the pneumatic or oleo dynamic type and comprises a fixed element 51 attached or coincident with the head flange 38 of the sleeve member 18, and a mobile element 52. These two elements 51, 52 are both concentric to the turbine shaft, configured and coupled in the manner of piston-cylinder and delimiting between them a chamber 53 that can be fed with a fluid under pressure, air or oil, through a passage 53'. The mobile element 52 couples through an axial thrust bearing means or like 54 and rest against to the terminal coupling 55 of the turbine shaft 15 designed for the transmission of a torque to the device to control. The whole is preferably of simple effect assisted by springs 56 placed between the fixed and mobile elements 51, 52 and operating in opposite directions to the thrust of the fluid under pressure.

Practically, the force for contrasting the axial thrust that is created on the shaft 15 during the operation of the turbine can be graduated by modulating the pressure of the feed fluid of the chamber 53 between the fixed element 51 and the mobile element 52 that carry the bearing 54. In fact, the level of the pressure then operating between the fixed and mobile elements of the aggregate, and correspondingly the axial force exercised on the shaft 15 by means of the bearing 54, can be adjusted by opportune algorithm in answer to the fluid pressure levels that can be measured at the entrance and exit of the turbine, and/or of the interstage pressure and/or of the power produced by the machine.

In particular, and advantageously, the pressure in the chamber 53 between the fixed and mobile elements of the aggregate can be supplied directly by the same work fluid it is fed by starting from the circuit upstream of the turbine or by the volute or by an interstage chamber.

Figure 3:
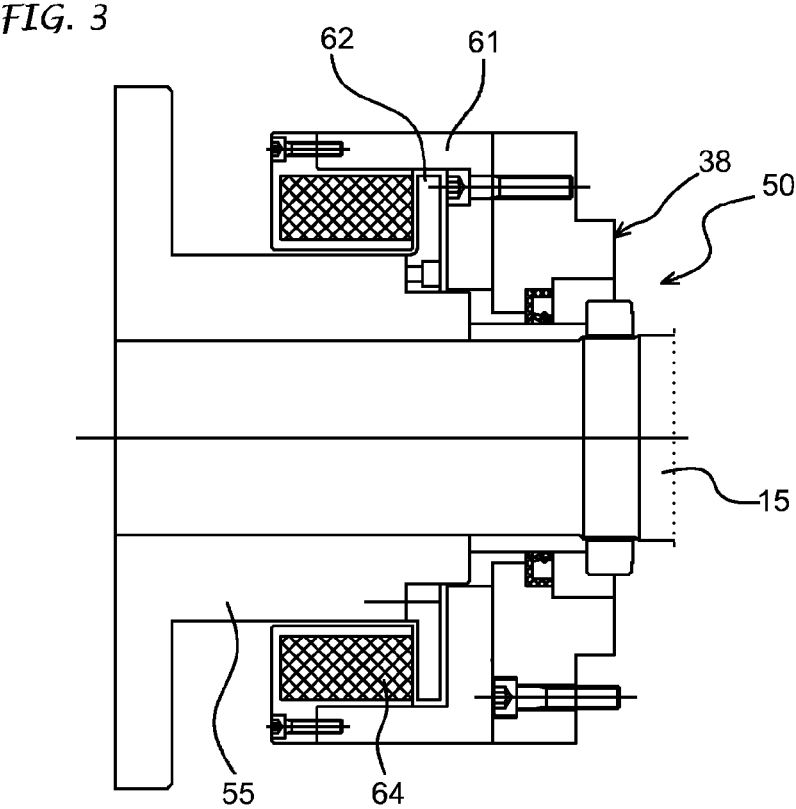
FIG. 3 shows a similar view of another contrast aggregate form of the axial thrust.

According to another way of execution as shown in FIG. 3, the aggregate 50 is comparable to a magnetic bearing. It comprises a fixed element 61 (it is also fixed or corresponding to the end flange 38 of the sleeve member 18) and a mobile element 62 fixed to the terminal joint 55 of the turbine shaft 15. In this case an electromagnet 64 is attached to the fixed element 61 facing the mobile element 62, so as to be able to cause the axial movements of the latter and to correspondingly stress the turbine shaft 15 with an axial force adjustable by a variation of the level of the current from time to time supplied to the electromagnet and in answer to the pressure of the fluid passing in the turbine.

Also to be noted that in both its ways of realization the aggregate 50 will be easily accessible to facilitate all maintenance work and/or replacement of its parts without having to open or dismantle the mounting system of the turbine shaft and that it will not have misalignment problems compared to the shaft, in that it can be assembled to function with a certain amount of play.

The invention claimed is:

1. A turbine for the expansion of gas and vapor, comprising:
   a body or case;
   a fixed external sleeve member, overhanging frontally from a frontal wall of said case; and
   a turbine shaft extending coaxially and rotating in said external sleeve member with the interposition of a supporting unit, said external sleeve member having a head flange to axially hold said supporting unit and said shaft ending with a joint to connect said shaft to a device to be operated, wherein said supporting unit includes ball bearings to support the turbine shaft in said external sleeve member, and between said external sleeve member and a contiguous end of said turbine shaft an assembly is provided, said assembly comprising a fixed element attached to said external sleeve member and a moving element located concentrically around said turbine shaft, said moving element being connected to said joint, said moving element generating an adjustable axial force so as to compensate the axial thrust of the turbine shaft to limit the application of improper axial loads on the ball bearings.

2. A turbine according to claim 1, wherein said moving element is associated with the joint of the turbine shaft with the interposition of a bearing, and said fixed element and said moving element are coupled to delimit between said fixed element and said moving element a chamber fed by a fluid under pressure to generate a contrasting axial force opposed to the axial thrust on said shaft, said force being adjustable according to a variation in the fluid pressure fed into the chamber between the fixed element and moving element in response to at least the pressure of the fluid in the turbine.

3. A turbine according to claim 2, wherein said chamber can be fed by the work fluid of the turbine derived starting from a circuit upstream of the turbine, from a volute or from a chamber inside the turbine.

4. A turbine according to claim 2, wherein between said fixed element and said moving element springs are placed operating in opposition to the thrust of the fluid in said chamber.

5. A turbine according to claim 1, wherein said moving element is connected to the joint integral with the turbine shaft, and said fixed element is attached to an electromagnet facing the moving element, so as to generate the axial movements of the moving element and to reciprocally stress the turbine shaft with an adjustable axial force by means of a variation of the current fed to the electromagnet and in response at least to the pressure of the fluid flowing through the turbine.

6. A turbine according to claim 2, wherein the fixed element of the assembly is fixed to the head flange of the external sleeve.

7. A turbine according to claim 2, wherein the fixed element of the assembly is made up of or integrated by the head flange of the external sleeve member.

8. A turbine according to claim 1, wherein said supporting unit comprises an internal coupling concentric to the turbine shaft and carrying ball bearings inside said internal coupling and sealing means operating on said shaft, and wherein said supporting unit is axially held in said external sleeve by the head flange, said supporting unit being extractable in block from said external sleeve member after removing the head flange.

9. A turbine according to claim 3, wherein between said fixed element and said moving element springs are placed operating in opposition to the thrust of the fluid in said chamber.

10. A turbine according to claim 1, wherein said axial thrust is in a direction of said ball bearings and said adjustable axial force is in a direction away from said ball bearings.

11. A turbine according to claim 1, wherein said turbine shaft comprises a turbine shaft longitudinal axis, said fixed element being located at an axially spaced location from said ball bearings with respect to said turbine shaft longitudinal axis.

12. A turbine according to claim 11, wherein said moving element is located adjacent to said fixed element.

13. A turbine for the expansion of gas and vapor, comprising:
   a body or case;
   a fixed external sleeve member, overhanging frontally from a frontal wall of said case; and
   a turbine shaft extending coaxially and rotating in said external sleeve member with the interposition of a supporting unit, said external sleeve member having a head flange to axially hold said supporting unit and said shaft ending with a joint to connect said shaft to a device to be operated, wherein said supporting unit includes ball bearings to support the turbine shaft in said external sleeve member, and between said external sleeve member and a contiguous end of said turbine shaft an assembly is provided to generate an adjustable axial force so as to compensate the axial thrust of the turbine shaft to limit the application of improper axial loads on the ball bearings, said assembly comprising a fixed element attached to the external sleeve member and a moving element located concentrically around the turbine shaft, and said moving element being associated with the joint of the turbine shaft with the interposition of a bearing, and said fixed element and said moving element being coupled to delimit between said fixed element and said moving element a chamber fed by a fluid under pressure to generate a contrasting axial force opposed to the axial thrust on said shaft, said force being adjustable according to a variation in the fluid pressure fed into the chamber between the fixed element and moving element in response to at least the pressure of the fluid in the turbine, wherein between said fixed element and said moving element springs are placed operating in opposition to the thrust of the fluid in said chamber.

14. A turbine for the expansion of gas and vapor, comprising:
   a body or case;

a fixed external sleeve member, overhanging frontally from a frontal wall of said case; and a turbine shaft extending coaxially and rotating in said external sleeve member with the interposition of a supporting unit, said external sleeve member having a head flange to axially hold said supporting unit and said shaft ending with a joint to connect said shaft to a device to be operated, wherein said supporting unit includes ball bearings to support the turbine shaft in said external sleeve member, and between said external sleeve member and a contiguous end of said turbine shaft an aggregate assembly is provided to generate an adjustable axial force so as to compensate the axial thrust of the turbine shaft to limit the application of improper axial loads on the ball bearings, wherein said assembly comprises a fixed element attached to the external sleeve member and a moving element located concentrically around the turbine shaft, said moving element being connected to the joint integral with the turbine shaft, and said fixed element being attached to an electromagnet facing the moving element, so as to generate the axial movements of the moving element and to reciprocally stress the turbine shaft with an adjustable axial force by means of a variation of the current fed to the electromagnet and in response at least to the pressure of the fluid flowing through the turbine.

15. A turbine according to claim 14, wherein said moving element is located adjacent to said fixed element.

* * * * *